United States Patent
Wood et al.

(10) Patent No.: US 6,816,703 B1
(45) Date of Patent: Nov. 9, 2004

(54) INTERACTIVE COMMUNICATIONS APPLIANCE

(75) Inventors: Michael C. Wood, Orinda, CA (US); Matthew Brown, Berkeley, CA (US); Jen Sward, Napa, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 738 days.

(21) Appl. No.: 09/721,802

(22) Filed: Nov. 22, 2000

Related U.S. Application Data

(60) Provisional application No. 60/181,967, filed on Feb. 10, 2000, and provisional application No. 60/168,214, filed on Nov. 30, 1999.

(51) Int. Cl.[7] .............................................. H04H 1/04
(52) U.S. Cl. ....................... 455/3.04; 455/88; 455/90.1; 455/41.2
(58) Field of Search ................ 455/90.1, 3.04, 455/3.06, 3.01, 41.2, 88, 555; 379/110.01, 93.25

(56) References Cited

U.S. PATENT DOCUMENTS

| | | |
|---|---|---|
| 4,840,602 A | 6/1989 | Rose |
| 5,245,656 A | 9/1993 | Loeb et al. |
| 5,614,940 A | 3/1997 | Cobbley et al. |
| 5,636,994 A | 6/1997 | Tong |
| 5,655,945 A | 8/1997 | Jani |
| 5,697,829 A | 12/1997 | Chainani et al. |
| 5,717,923 A | 2/1998 | Dedrick |
| 5,733,131 A | 3/1998 | Park |
| 5,740,549 A | 4/1998 | Reilly et al. |
| 5,746,602 A | 5/1998 | Kikinis |
| 5,752,880 A | 5/1998 | Gabai et al. |
| 5,754,939 A | 5/1998 | Herz et al. |
| 5,761,662 A | 6/1998 | Dasan |
| 5,819,284 A | 10/1998 | Farber et al. |
| 5,855,483 A | 1/1999 | Collins et al. |
| 5,873,765 A | 2/1999 | Rifkin et al. |
| 5,915,238 A | 6/1999 | Tjaden |
| 5,926,442 A | 7/1999 | Sirhan et al. |
| 5,995,455 A | 11/1999 | Kutosky |
| 6,012,961 A | 1/2000 | Sharpe, III et al. |
| 6,075,195 A | 6/2000 | Gabai et al. |
| 6,130,892 A | 10/2000 | Short et al. |
| 6,144,673 A | 11/2000 | Korus |

OTHER PUBLICATIONS

Mary Kathleen Flynn with Melissa J. Perenson, "The Daily Me", *PC Magazine*, Sep. 14, 1993, p. 29.

John R. Quain, "Journalist Delivers Your Own Personalized Newspaper", *PC Magazine*, Oct. 12, 1993, p. 49.

*Primary Examiner*—Quochien B. Vuong
*Assistant Examiner*—Blane J. Jackson
(74) *Attorney, Agent, or Firm*—Townsend and Townsend and Crew LLP

(57) ABSTRACT

An interactive communications appliance for broadcasting personalized information is disclosed. The interactive communications appliance comprises a transceiver for receiving personalized information transmitted via a wireless link. A memory stores the personalized information and an audio device broadcasts the personalized information to a user.

15 Claims, 7 Drawing Sheets

INTERACTIVE COMMUNICATIONS APPLIANCE

CROSS-REFERENCES TO RELATED APPLICATIONS

This application claims the benefit of U.S. Provisional Patent Application No. 60/168,214 filed Nov. 30, 1999, and U.S. Provisional Patent Application No. 60/181,967 filed Feb. 10, 2000. Both of these provisional patent applications are herein incorporated by reference in their entirety for all purposes.

BACKGROUND OF THE INVENTION

Traditionally, people have obtained information from traditional information media such as newspapers, TV and radio. A number of problems are associated with such traditional information media. For example, the information in newspapers may not be current. Because of the time required to print and deliver a newspaper, the news and other information in the newspaper may be more than five to ten hours old by the time it is received. Moreover, traditional informational media such as TV, radio, and newspapers deliver information that may not be of interest to the user. In conventional TV and radio broadcasts, for example, the user must listen to stories that are not of interest while waiting for stories of interest to be presented. In a newspaper, the user must sift through news and stories that may be of interest before getting to the news and stories of interest. Consequently, a user can waste time trying to obtain desired information.

People have been able to access current news and information through the Internet. Information obtained through the Internet is generally more current than information in, e.g., newspapers. On-line news services, for example, put news items on server computers. Using an Internet-accessible computer, users can access this information as soon as it is put on the server computers. In comparison to a printed newspaper, for example, news delivered through the Internet requires no printing or physical delivery that impedes the delivery of information to the user.

In response to the need to filter through unwanted information, Internet-based informational services such as Pointcast (now Entrypoint) were created to help users receive only the information that they want. Using a service such as Pointcast, users may have only information that they are interested in delivered to them. The user need not actively seek desired information. For example, if a user is interested in receiving information about stocks, the user can specify this with the service. Current stock information is automatically delivered to the user's computer.

While the Internet-based information services have addressed many of the problems of traditional informational media, many improvements could be made. For example, much of the information obtained through the Internet is graphical. Viewing graphical information such as pictures and text can occupy both the eyes and hands of a user. It is difficult to consume such information when, for example, the user's eyes and hands are occupied. For example, it is difficult to view a Web page with news on it while shaving. Furthermore, a typical household has only one or two Internet-accessible computers and only one or two Internet access lines for typically four or more potential users (e.g., a family of four). Some potential users may not be able to use the computer when they want to. For example, one family member may be using the only computer in the house, thus preventing other family members from using it.

As users' lives become busier, it would be desirable for users to obtain more information of interest to them.

It is especially difficult for a person to consume graphical information in the morning. In the morning, people generally do not have much time to consume graphical information as they are busy preparing to go to work or school. Children, in particular, are unlikely to view graphical information on Web sites before school, because their parents do not want them to use a home computer before they go to school. The children might be tempted to play games or interact with the computer in a manner, which will delay the children's departure from the home.

Embodiments of the invention address these and other problems.

SUMMARY OF THE INVENTION

Embodiments of the invention relate to interactive communications appliances, systems, and methods for broadcasting personalized information to a user. The personalized information may be obtained using a user profile. The personalized information may then be sent to an interactive communications appliance where it may be broadcast to the user.

One embodiment of the invention relates to an interactive communications appliance for broadcasting personalized information. The interactive communications appliance comprises: a processor; a transceiver for receiving personalized information transmitted via a wireless link, the transceiver being operatively coupled to the processor; a memory for the storing personalized information, the memory being operatively coupled to the processor; and an audio device for broadcasting the personalized information.

Another embodiment of the invention relates to a system for broadcasting personalized information to a person. The system comprises: an interactive communications appliance having a first transceiver; a second transceiver communicating with the first transceiver via a wireless link; a client computer operatively coupled to the second transceiver; and a server computer. The interactive communications appliance broadcasts personalized information received from the server computer.

Yet another embodiment of the invention is directed to a method for broadcasting personalized information. The method comprises: receiving a user profile for a user; obtaining personalized information based on the profile of the user; transmitting the personalized information to a client computer via a communication medium; transmitting the personalized information to an interactive communications appliance via a wireless link between first and second transceivers; and broadcasting the personalized information to the user.

These and other embodiments are described in greater detail below with reference to the Figures.

DETAILED DESCRIPTION

Figure 1:
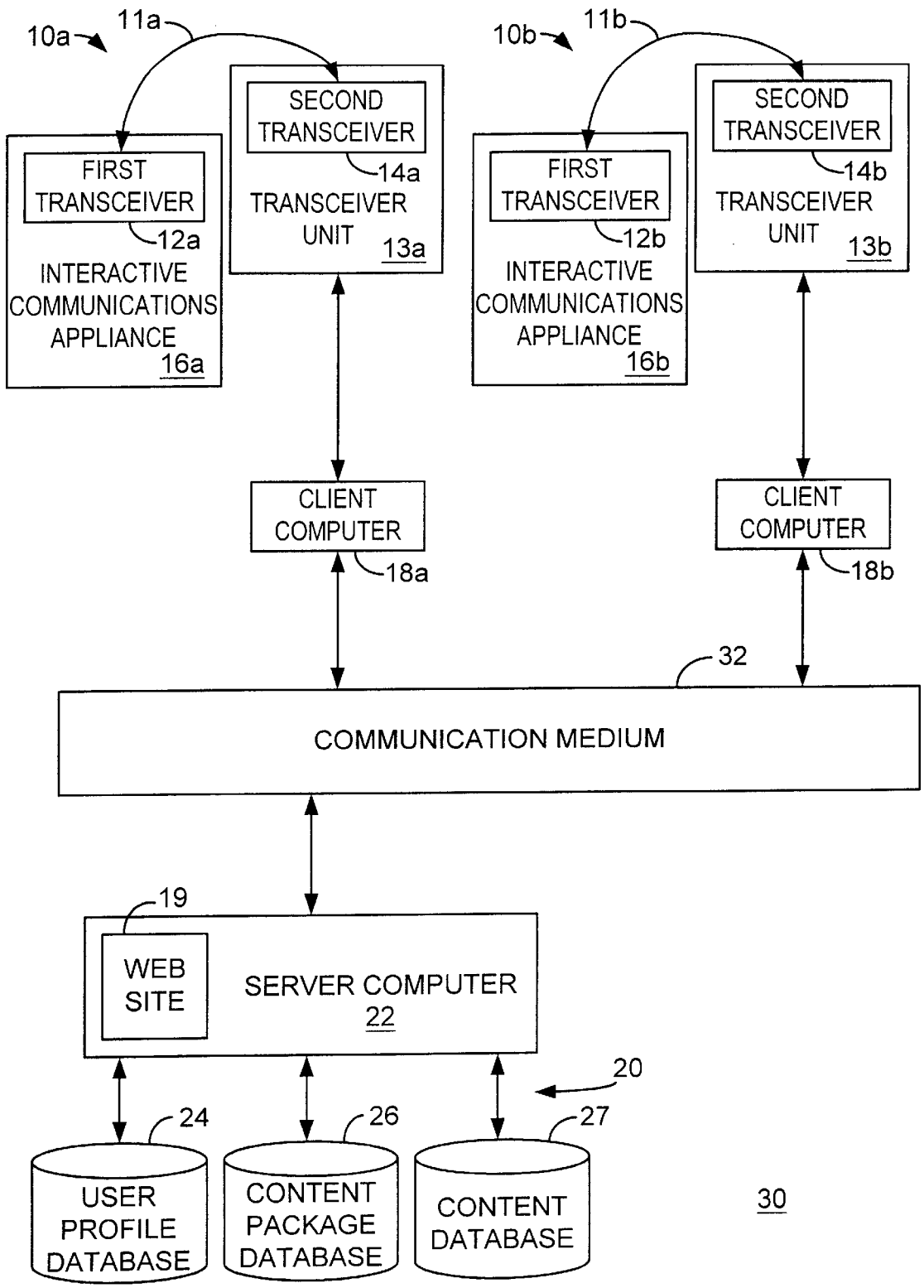
FIG. 1 shows a block diagram of a system according to an embodiment of the invention.

Embodiments of the invention are directed to an interactive communications appliance. The interactive communications appliance receives personalized information from a server computer. Once the interactive communications appliance receives the personalized information, the personalized information is broadcast to the user.

The user may be of any suitable age. Preferably, the user is 18 years old or less. More preferably, the user is between about 8 to about 16 years of age. In preferred embodiments of the invention, the information broadcast to the user is entertaining or educational for persons of the user's age group and is otherwise suitable for the user's age group.

In an illustrative embodiment of the invention, a client computer, such as a stand-alone personal computer or a laptop computer, contacts a server computer via a communication medium such as the Internet. Using a user profile, the server computer can retrieve and/or arrange personalized information for a user and then send it to the client computer via a communication medium such as the Internet. In embodiments of the invention, arranged information is provided to the user as a personalized audio presentation. For example, in some embodiments of the invention, the retrieved information is not presented to the user as a conventional radio broadcast would present it (e.g. "The Red Sox beat the White Sox yesterday in a 20 inning game"). Rather the retrieved information is arranged as a personalized presentation to the user (e.g. "Hank, can you believe it? Your favorite baseball team beat out the White Sox yesterday in an incredibly long game!"). Once the client computer receives the personalized information, a transceiver coupled to the client computer transmits the personalized information to another transceiver coupled to an interactive communications appliance through a wireless link between the transceivers. The wireless link is preferably a radio frequency (RF) link. The interactive communications appliance has a first transceiver for receiving information from the client computer which is coupled to a second transceiver. The personalized information received by the first transceiver is then stored in a memory in the interactive communications appliance.

In some embodiments, after the personalized information is stored, the wireless link between the first and second RF transceivers is terminated. In these embodiments, the interactive communications appliance and the client computer do not communicate with each other and the interactive communications appliance can operate independently of the client computer. In other embodiments, the client computer may transmit and the interactive communications appliance may receive and broadcast the personalized information to the user in real time (e.g., as in a streaming audio process).

At a predetermined time, the personalized information is retrieved from memory in the interactive communications appliance and is broadcast the user. For example, the personalized information may be stored in memory in the interactive communications appliance while the user is sleeping. An alarm in the interactive communications appliance sounds at a predetermined time to wake the user up.

After the alarm sounds, the personalized information stored in memory may be broadcast to the user through an audio device such as a speaker. For example, after the user is awakened by the alarm, the user can depress a button on the interactive communications appliance to turn the alarm off. Turning off the alarm can initiate the broadcast of the personalized information. Alternatively, the broadcast may start after a time delay during which the user neglects to turn the alarm off.

After the interactive communications appliance broadcasts the personalized information, he can listen to the broadcast personalized information. The personalized information may include, for example, information relating to the weather or traffic in the user's geographic location. The broadcast information contains mostly information that is either relevant to the user's interests and/or is entertaining to the user. The broadcast information preferably does not contain significant amounts of information that are not of interest to the user.

Embodiments of the invention have a number of advantages. For instance, in embodiments of the invention, the user need not spend time filtering through information that the user is not likely to be interested in. For example, if the user is interested in financial news, but is not interested in sports, then the broadcast personalized audio information may include information such as current interest rates and stocks, but not the previous day's baseball or football scores. The user may listen to relevant information, without having to filter through vast amounts of information. Moreover, because the personalized information is in audio form, the user can listen to the audio information while still performing tasks that require the use of his eyes or hands. For example, the user can shave in the morning and still listen to the personalized audio information. The personalized information can thus be obtained more efficiently by a user than, for example, graphical information. When receiving audio information; a user may use his eyes and hands to perform other tasks. Furthermore, since the interactive communications appliance may operate independently of the client computer in preferred embodiments, the user need not compete with others in, for example, the same household for access to a computer and to the Internet. Each person can listen to individually personalized information though there may only be one household computer with direct Internet access. In some embodiments, a single household computer may transmit personalized information to many different interactive communications appliances in a home.

Any suitable personalized information may be delivered to the interactive communications appliance. For example, the personalized information may relate to local, national, or international news, weather, sports information, educational information, and TV programming information. The personalized information may also include science news (e.g., space, animals, and natural science), entertainment news (e.g., movies, music, books, celebrities), horoscopes, jokes, fun facts, and games. The personalized information also includes music that has been selected for a particular user. For example, the user may have specified in a user profile a liking for country music. Country music songs can be selected and included in that user's content package. Informational items such as these may be obtained from one or more information services. For example, current news may be obtained through one or more news services such as the Associated Press (AP).

The personalized information may also include schedule items. The schedule items may be broadcast with or without content such as personalized news and weather. Schedule items may include reminder messages for holidays, birthdays, anniversaries, meetings, and the like. The reminders and other schedule items may be stored in an electronic scheduler on the interactive communications appliance or a server computer (e.g., a Web server, and/or the client computer. Computer code for keeping the electronic scheduler for the user and for keeping the scheduler synchronized between the client computer and the interactive communications appliance may be present in the client computer or the interactive communications appliance. The scheduler stores the schedule items either by designating only a day and optionally designating both a day and a time in an electronic calendar. On the day when an event is scheduled for the user, the interactive communications appliance broadcasts a message to the user as a reminder of the event on that day. For example, a parent may store a reminder in the scheduler that on January 30, the parent is to attend a conference with his son's teacher. On the morning of January 30, the interactive communications appliance can broadcast the reminder message to the parent when he wakes up. The reminder message might be, for example, "Remember, you have a meeting with Hank's teacher at 3 p.m. today". Upon hearing the reminder message, the user is reminded that he is scheduled to attend the parent-teacher conference.

A system according to an embodiment of the invention can be described with reference to FIG. 1. The system 30 includes a host site 20 and user sites 10(a), 10(b). Users at the user sites 10(a), 10(b) communicate with the host site 20 through a communication medium 32 such as the Internet. The user sites 10(a), 10(b) may be, for example, a home, school, or workplace. The host site 20 may be the location of a host company that runs a server computer 22.

The server computer 22 is typically a powerful computer or cluster of computers. For example, the server computer 22 can be a large mainframe, a minicomputer cluster, or a group of servers functioning as a unit. In one example, the server computer may be a database server coupled to a Web server. The server computer 22 can behave as a single computer that services the requests of one or more client computers 18(a), 18(b). For example, one or more client computers 18(a), 18(b) at different user sites 10(a), 10(b) can communicate with the server computer 22 through the communication medium 32 and optionally through one or more Internet Service Providers (ISPs) (not shown). The client computers 18(a), 18(b) typically have less memory and less computing power than the server computer 22. Typically, the server computer 22 is remotely located with respect to the client computers 18(a), 18(b).

The server computer 22 can have computer code for performing any suitable function. For example, the server computer 22 can have code for updating a user profile in a user profile database, retrieving data from any suitable database, and sending data to any person. Computer code may also be provided for selecting content for a content package, assembling the content package, and sending the content package to the user.

The server computer 22 and the client computers 18(a), 18(b) communicate through a communication medium such as the Internet, and more particularly the World Wide Web (WWW). Typical communication protocols which can be used by the server computer 22, the client computers 18(a), 18(b), or the interactive communications appliances 16(a), 16(b) may include HTTP (hypertext transfer protocol), TCP/IP (terminal communication protocol/Internet protocol), or other protocol.

The server computer 22 may have data representing a Web site 19. The Web site 19 may any suitable number of Web pages and is preferably entertaining to users under 18 years of age. On the Web site 19, the user can create a user profile, set operational preferences, play games, select content for a content package, and view personal messages. Other persons may also contact the Web site 19 to upload messages or select content for the user. For example, a teacher, a parent, or other individual may upload messages to the Web site 19 or select content on the Web site 19. The uploaded or selected content can be included in a content package to be sent to the user.

GUIs (graphic user interfaces) on the Web pages of the Web site 19 or on software run on the client computer can be used to create a user profile or control the operation of the interactive communications appliance 16. The GUIs may have any number of data fields where users may enter information to form a user profile. Data fields may receive the information regarding the user's age, sex, income, marital status, likes and dislikes, color preferences, favorite sizes and shapes, preferred learning modes, employer, job title, mailing address, phone number, personal and business areas of interest, favorite music groups, favorite types of music, favorite sports, etc. The GUIs may also be used to control the operation of the system. For example, GUIs may provide the user with the ability to change the appearance (e.g., the color) of the time display on the interactive communications appliance. In another example, a user may enter data into a GUI to change the time displayed on the time display. This might be done, for example, to update the time in the event of a power outage.

The computer code for creating the GUIs can reside on the server computer 22 and/or on the client computers 18(a), 18(b). If the code is on the client computers 18(a), 18(b), the user profile can be created on the client computers 18(a), 18(b). After the user profile is created, the user profile can be uploaded to the server computer 22 and the server computer can store the created user profile in a user profile database 24.

Once the user profile is created it may be updated in any suitable manner. For example, the user profile can be updated manually by the user. The user may use the GUIs on the system to change or update any information in his user profile. Alternatively or additionally, data relating to the user's actions may be used to modify a user profile. For example, if a user's profile does not initially mention that the user is interested in sports, and the user repeatedly requests that current sports scores be included in his content package, the user's profile can be automatically updated to indicate that the user is interested in sports scores. The casual interaction of the user may also be noted by the system to update the user's personal profile. If the user repeated skips over a certain type of presentation (e.g. weather reports), or repeatedly chooses to participate in another type of presentation (e.g. opinion polls), the interactive communications appliance will "learn" not to present the former, and to increase presentation opportunities relating to the latter.

The server computer 22 may have access to any suitable number of databases of information. For example, the server computer 22 may have access to a user profile database 24, a content package database 26, and a content database 27. The content database 27 in turn may access an archived database (of e.g. audio files) or a stack of retained stories. As shown in FIG. 1, the personal profile database 24, the content package database 26, and the content database 27 are shown as distinct entities. However, the databases may be combined together in any suitable manner and/or additional databases may be used. For example, the content database 27 could alternatively be one static content database with static information such as jokes and horoscopes and another dynamic content database with dynamic Content such as news and sports scores. Static information is information that typically does not change over time. Dynamic information, on the other hand, is information that typically does change over time. Examples of dynamic information may include news, weather, and sports.

The personal profile database 24 may include the user's personal preferences and information about the user. The user profile information may include basic information about the user. Such basic information includes the user's age, hobbies, address, phone number, e-mail address, school, relatives, teachers, parents, phone number, etc. The user profile information may also include information regarding the user's preferences. User preferences may include preferences such as favorite subjects, relatives, teachers, favorite songs, favorite sports, favorite foods, favorite cartoons. User preferences may also include operational preferences such as the days and times that the user wants information delivered to him. The personal profile database 24 may also include schedule items such as notes, messages, and reminders related to, for example, anniversaries, birthdays, appointments, etc.

The content database 26 may include any suitable content. The content may include static information such as problems (e.g., questions, puzzles, riddles, quizzes), as well as songs, games, hints, music, facts, greetings, and messages (e.g., help, encouragement, reminders, or error messages). The information may include articles, news accounts, stories, etc. Categories of information include national news, international news, state news, local news, financial news, business news, cooking, home improvement, sports, entertainment, music, movies, television, health, nutrition, etc.

The content in the content database 26 may also be in any suitable form. For example, the content may be in the form of compressed or uncompressed data. The content may be in the form of sound files such as MP3 files, WAV files, and MIDI (Musical Instrument Digital Interface) files. The content may also be in the form of graphic files such as video files, image files (e.g., bitmaps), and text files. If the content is in the form of graphical data such as text data, the text data can be converted to audio data by using code for converting text data to speech data. The code for converting text data to speech data may be on the client computer or the interactive communications appliance. In addition, the content may be in the form of applications that may be run on the client computer or the interactive communications appliance.

In some embodiments, the server computer 22 may periodically establish communication with information providers (not shown) through the communication medium 32. The information providers may operate their own Web sites and databases of news, music, etc. The server computer 22 may collect a variety of information items from the information providers and store them in the content database 27. As a result, the server computer 22 can then have direct access to a collection of the most current information available from different sources. Alternatively, the server computer 22 could gather information from the information providers by accessing the communication medium 32. The gathered information could then be sent directly to the content package database 26 where a content package including the gathered information is stored and optionally updated until it is ready to be downloaded to the user.

The content package database 27 may store content packages that are created for the users. For example, the server computer 22 may retrieve a user's profile from the user profile database 24 and may retrieve information from the content database 26 based on the user profile. The retrieved information is personalized for that user and may be stored as a content package in the content package database 26. The content package can be stored in the content package database 24 until it is downloaded to the user.

Other information may also be stored in the user's content package. For example, a person may upload audio messages intended for a user to the server computer 22. The uploaded text or audio message may be included with a content package for the user and the content package may be stored in the content package database 26. For example, a person can upload a text message or an audio file to the Web site 19 on the server computer 22. The server computer 22 can store the uploaded text message or audio file in the content package database 26 so that it is placed in the user's content package. Uploaded text messages can be converted to audio data before or after it is included in the content package. When the content package is eventually downloaded to the user, the text or audio message from the person may be included in the downloaded content package. If the message is in the form of text data, then it can be converted to audio data at the client computer or the interactive communications appliance. Once converted, it can be broadcast with other information in the content package. Alternatively, a message could be selected from tables of pre-recorded audio.

Each user site 10(a), 10(b) may include an interactive communications appliance 16(a), 16(b), a client computer 18(a), 18(b), and a second transceiver 14(a), 14(b). Each interactive communications appliance 16(a), 16(b) includes a first transceiver 12(a), 12(b) that communicates with the second transceiver 14(a), 14(b) via a wireless link 11(a), 11(b). Each second transceiver 14(a), 14(b) is present in a transceiver unit 13(a), 13(b), and each transceiver unit 13(a), 13(b) is coupled to a client computer 18(a), 18(b). The client computers 18(a), 18(b) communicate with the server computer 22 via the communication medium 32.

The client computers 18(a), 18(b) are typically microcomputers and may include a modem or other connection device for accessing the communication medium 32. A typical client computer may include a central processing unit (CPU) (e.g., a microprocessor), a keyboard, a modem, a display monitor, a CD-ROM (compact disk-read only memory), a floppy disk drive, and a hard disk drive. It may optionally include a mouse, a touchpad, and a stylus for additional data entry.

Any suitable computer code may be present on the client computers 18(a), 18(b) to facilitate the operation of the system. For example, code for accessing the server computer 22 at predetermined times and/or dates set by the user or other person, or for accessing the server computer 22 to provide a stream of control data and audio data on a real-time basis may be on the client computers 18(a), 18(b). For example, an on-line chat-line where users could log in, and talk to other users could be provided in the system. Code for converting text data to audio data may also be on the client computer. The code for performing functions such as these may be supplied to the client computer through the floppy disk drive, the CD-ROM drive, and/or other storage devices that receive removable information storage media. Alternatively, code can be downloaded through a modem (not shown) or other communications device.

Each client computer may include a code for creating a schedule for the user and code for creating a message center where text or audio messages can be received, sent and created. Both the scheduler and the message center may be in an HTML (hypertext markup language) format or other Internet or browser compatible format. The user's schedule can be kept on the client computer, server computer, or the interactive communications appliance. Schedule items need not, but could be sent to the server computer for storage in a database. In some embodiments, a schedule can be created and stored on the client computer. The schedule can be updated by the user as events need to be scheduled. At the client computer, schedule items can be included in a content package received from the server computer. The modified content package can then be sent from the client computer to the interactive communications appliance where the information in the content package can be broadcast to the user.

The client computer and/or the interactive communications appliance may store any suitable number of pre-recorded, reusable audio portions or graphic files. For example, the interactive communications appliance may have pre-recorded, reusable audio portions that have phrases which can be combined with certain information to personalize an audio message to the user. For example, a pre-recorded, reusable audio portion may be the phrase "Waaake up, (insert child's name), rise and shine!". In another example, the pre-recorded audio portion may be, "Hi Hank! Did you know that the (insert team 1) beat the (insert team 2) by a score of (insert score of team 1) to (insert score of team 2)?". By having pre-recorded, reusable audio portions, less data needs to be transferred to the interactive communications appliance resulting in faster data transfer. The pre-recorded, reuseable audio portions may also include various sound effects to make the interactive communications appliance more entertaining to the user. Examples of sound effects include crowd noise, thunder and a drum beat. In embodiments of the invention, the reusable content may be used to create audio messages for broadcast on specific days or at specific times. Updated, pre-recorded, reusable audio portions or other audio data may be provided periodically (e.g., monthly) by the server computer 22.

The first transceiver 12(a) and the second transceiver 14(b) communicate with each other through a wireless link 11(a), 11(b). When the first and the second transceivers 12(a), 14(a), 12(b), 14(b) are in communication with each other, the interactive communications appliances 16(a), 16(b) and the client computers 18(a), 18(b) at their respective user locations 10(a), 10(b) are also in communication with each other. The wireless link 11 (a), 11 (b) can allow for two-way communication between the interactive communications appliance 16(a), 16(b) and the client computer 18(a), 18(b). The wireless link 11(a), 11(b) may be, for example, an infrared link, an optical link, or a RF link. The data transmission between the transceivers 12(a), 12(b), 14(a), 14(b) may be either asynchronous or synchronous.

RF wireless links are preferred as they permit the interactive communications appliances 16(a), 16(b) to be used if their respective client computers 18(a), 18(b) are not within its line-of-sight. For example, by using an RF link, a client computer 18(a), 18(b) may be in a home office while one or more interactive communications appliances 16(a), 16(b) are in different rooms in the home. For example, the different interactive communications appliances 16(a), 16(b) may be present in different bedrooms of a home.

A commercially available wireless communication technology called "Bluetooth™" can be used in embodiments of the invention. Bluetooth™ is a high speed, low power microwave wireless link technology, designed to connect phones, laptops, PDAs (personal digital assistants) and other portable equipment together with little or no work by the user. Unlike infrared link technology, Bluetooth™ does not require line-of-sight positioning of connected units. When one Bluetooth™ product comes within range of another (e.g., between about 10 centimeters and 100 meters), they automatically exchange address and capability details. They can, for example, establish a 1 megabit (or greater) link between transceivers. Bluetooth™ protocols handle both voice and data. Another commercial wireless technology that could be used is Firefly™.

In embodiments of the invention, many interactive communications appliances (e.g., 2 or more) may be present at a user site while using fewer client computers (e.g., a single client computer). Data to different interactive communications appliances may be, for example, downloaded during the night while the different users are asleep. Preferably, the data is downloaded and transmitted to each interactive communications appliance just before an alarm is preset to sound in the interactive communications appliance. Then, the interactive communications appliances may broadcast up-to-date information to each of the different users. In the morning, each respective interactive communications appliance in the home can already have respectively different content packages stored in it for each respective user. When each user wakes up, the personalized information in his personalized content package in his respective interactive communications appliance will be broadcast to him. This can be done without interference from other users and without waiting for data to download. In addition, other appliances having compatible electronics may interface to the client computer via the first transceiver.

Figure 2A:
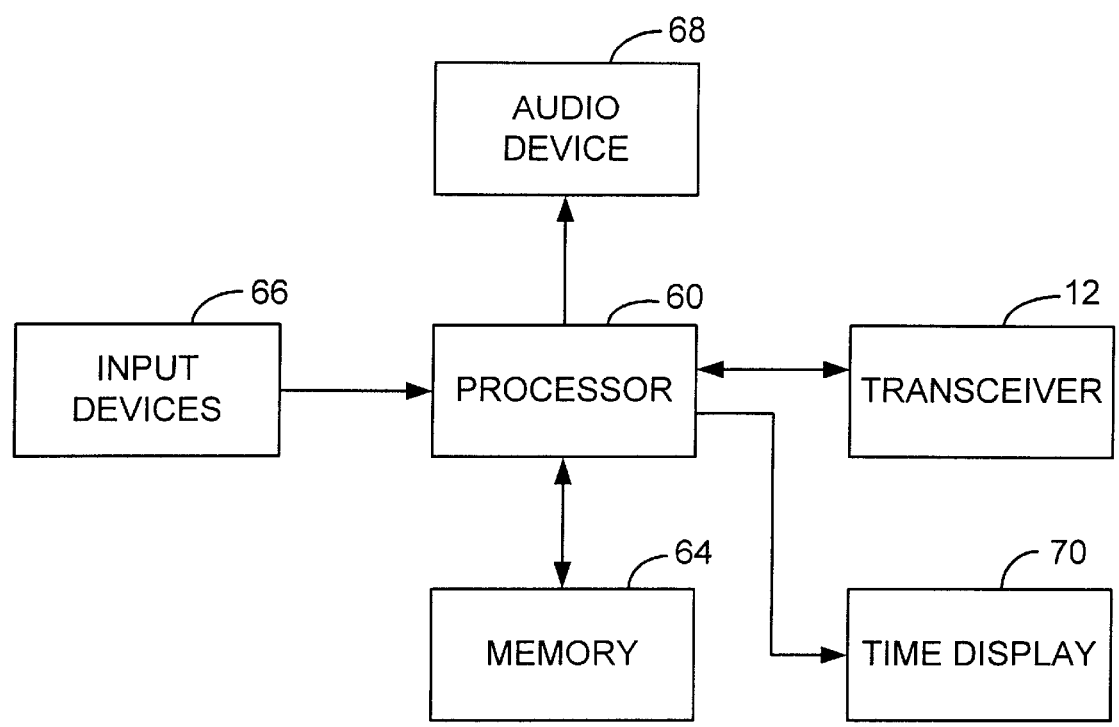
FIG. 2A shows a block diagram showing some components of an interactive communications appliance according to an embodiment of the invention.

A block diagram of an interactive communications appliance 16 according to an embodiment of the invention is shown in FIG. 2A. The interactive communications appliance 16 may include a transceiver 12, an antenna (not shown), a memory 64, input devices 66, an audio device 68, and a time display 70 coupled to a processor 60. Batteries or an AC (alternating current) source may power the interactive communications appliance 16.

The processor 60 may include one or more microprocessors that facilitate the operation of the interactive communications appliance 16. In this regard, the processor 60 may include any suitable number of speech synthesizer chips, central processing units, ASICs (application specific integrated circuits), etc.

The memory 64 may be any suitable temporary or permanent information storage device. For example, the memory 64 may include one or more of optical, magnetic, or electronic storage media such as optical or magnetic disks, tapes, sticks, and the like. Storage devices such as these may be used alone or in combination to make up the memory 64 of the interactive communications appliance 16. Any suitable number of RAM (random access memory), ROM (read only memory) and EPROM (erasable programmable memory) chips may also be included in the memory 64 of the interactive communications appliance 16.

The audio device 68 may include a speaker, or an audio jack or connection for a headphone or an earphone. An audio amplifier (not shown) may amplify any signals to the audio device 68. Preferably, the audio device 68 is a speaker. The speaker may be any suitable size. For example, the speaker may be 3 inches in height or width (or more or less than this value).

The input devices 66 may include buttons, speech recognition devices, microphones, and the like. Preferably, the interactive communications appliance 16 includes a snooze button, an on/off button, and data input buttons such as an alphanumeric keyboard or yes/no buttons. Other input devices may include a volume control knob or button, time setting buttons, skip forward buttons, skip backward buttons, alarm time setting buttons, and a help button. In some embodiments, the user may interact with the interactive communications appliance 16 using the input devices 66. For example, the interactive communications appliance 16 may broadcast a question to the user and the user can answer the question using the input devices 66. In one example, the interactive communications appliance 16 may ask the question, "Hi Hank! Do you want to hear yesterday's baseball scores?". The user can answer this question by, for example, pressing a yes or no button on the interactive communications appliance 16. In addition, the server could follow up with a polling question, like, "Hey, Sally, do you like the latest song from N'Sync™ that we just played for you?" The user can again answer this question by using an input device on the interactive communications appliance 16. The user's response may, at some later time, be uploaded to the client computer or the server. The client computer or the server computer logs the response, and may modify the user profile based on the response.

The time display 70 can display the current time. The time display 70 may be, for example, an LED (light emitting diode) time display, a LCD (liquid crystal display) time display, or an analog time display. The time display 70 may have any suitable dimensions. In a typical example, the time display may be larger than 2 inches by 1 inch in size (e.g. 2.5×1.5 inches or more). In some embodiments, the time display 70 displays the time for a majority of the day and can do so when the client computer is off. It can also provide video animations at predetermined times. Video animations and text may appear on, for example, a LCD driven by data that is transferred to the interactive communications appliance 16 along with the audio data. For example, on the user's birthday, a birthday cake with flickering candles running from for 1 to 5 seconds with the user's name written on it may be displayed. After the animation is complete, the current time can be displayed. The video animations may alternatively be provided on a display screen that is separate and distinct from the time display.

The interactive communications appliance 16 preferably includes an alarm (not shown). The alarm may produce any suitable sound to alert the user or wake up the user. For example, the alarm may be a buzzer, ringer, or may be a synthesized voice (e.g., "Good morning Hank! Rise and shine!"). The alarm may be set to go off by setting a timer device (not shown) in the interactive communications appliance 16. The timer device may be preset by the user to sound the alarm at a predetermined time or day set by the user.

The interactive communications appliance 16 may include other devices. For example, the interactive communications appliance 16 may include an LED or other indicator (not shown) that can indicate to the user that a new content package is stored in memory and can be consumed by the user. A conventional AM/FM radio may also be included in the interactive communications appliance 16 if desired. The interactive communications appliance 16 may also include a device for preselecting one or more radio channels on the interactive communications appliance. For example, the user may program the interactive communications appliance 16 to play one, two, or more radio stations at predetermined times.

The transceiver 12 may be adapted to transmit or receive IR (infrared), RF (radio frequency), or optical signals from another transceiver. Preferably, the transceiver 12 can transmit or receive RF signals more or less than a 100 foot radius (e.g., a 40 foot radius). Also, the transceiver 12 may operate at different frequency channels so that different channels may be selected to avoid potential interference with other wireless devices in a household such as wireless telephones.

Figure 2B:
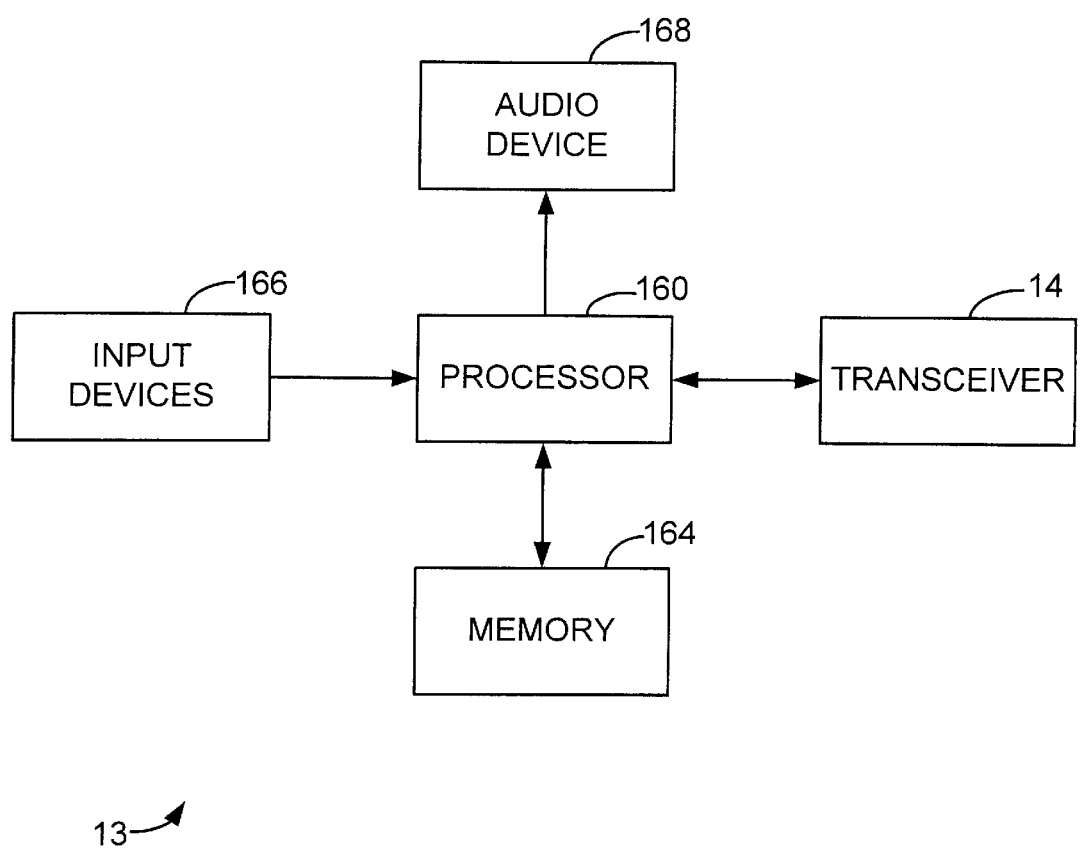
FIG. 2B shows a block diagram showing some components of a transceiver unit according to an embodiment of the invention.

A block diagram of a transceiver unit 13 according to an embodiment of the invention is shown in FIG. 2B. The transceiver unit 13 may include a transceiver 14 and an associated antenna. The transceiver in the transceiver unit 13 may have the same or different characteristics as the transceiver 12 in the interactive communications appliance 16 described above. The transceiver 14 may also have a memory 164, input devices 166 (e.g., USB or serial input devices), and an optional display device 168 (e.g., an LED) coupled to a processor 160. Batteries, alternating current, or power from, for example, a USB source may power the transceiver unit 13 coupled to the client computer.

Figure 3:
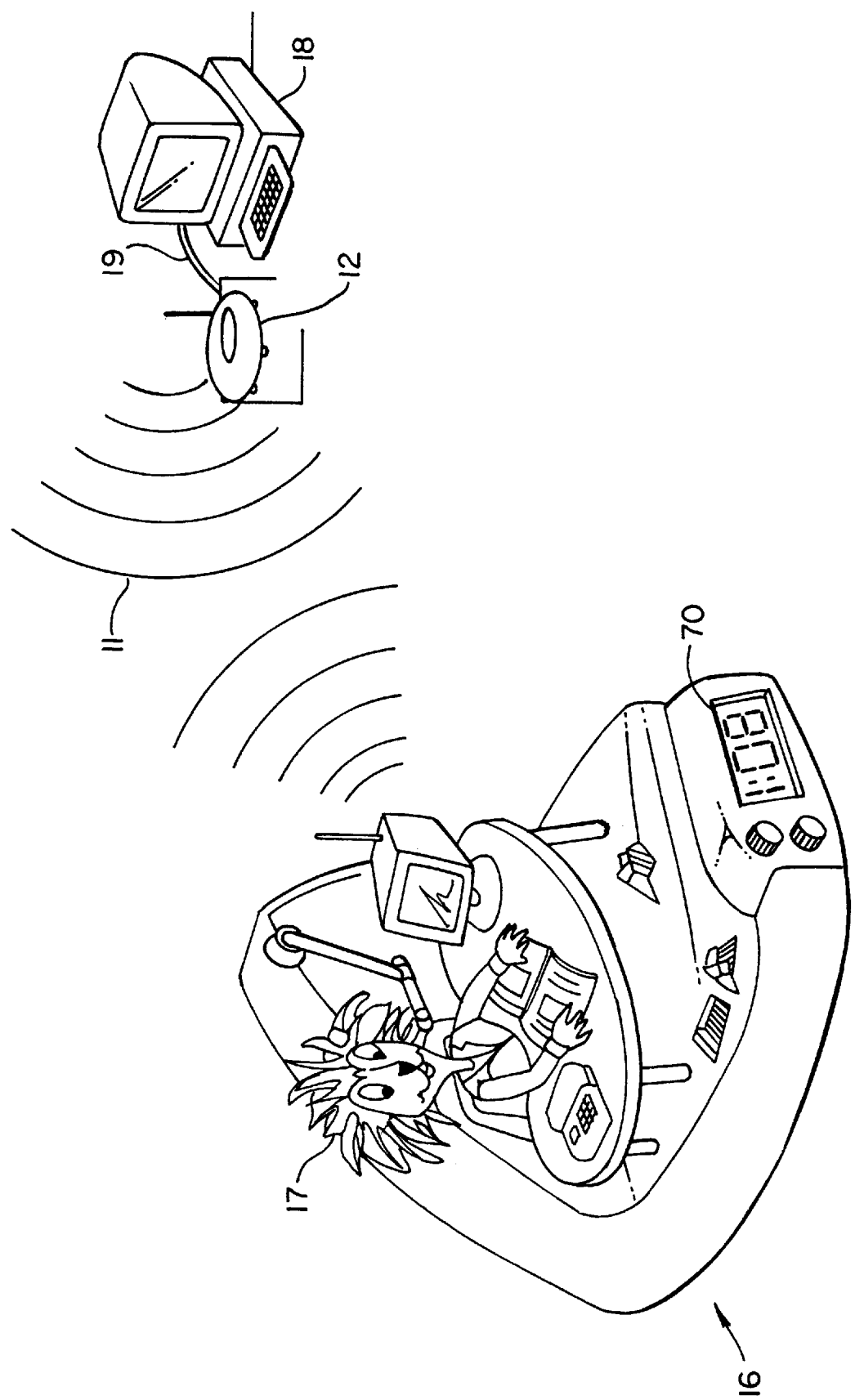
FIG. 3 shows a perspective view of an interactive communications appliance embodiment interacting with a transceiver coupled to a client computer.

A perspective view of an interactive communications appliance 16 embodiment and a client computer 18 is shown in FIG. 3. The interactive communications appliance 16 has a first transceiver (not shown) embedded within its housing. The housing may be a plastic molded housing. The first transceiver communicates with a second transceiver 12 through a wireless link 11. The second transceiver 12 is coupled to a client computer 18 via a cable 19. The cable 19 may be connected to an external communication port. It may be a serial cable connected to a serial port, or may be a USB cable connected to a port such as a USB (universal serial bus) port of the client computer 18.

As shown in FIG. 3, the interactive communications appliance 16 may also include a figurine 17. The figurine 17 makes the interactive communications appliance 16 more attractive in appearance. The figurine 17 may be made of hard plastic or may be plush. It may also be in the form of any suitable animal (e.g., a frog, a mouse, a lion, etc.) or cartoon character. The figurine 17 makes the interactive communications appliance 16 makes it more attractive to children than it would otherwise be without the figurine 17. Other features such as bright colors and oversized components (e.g., an oversized speaker) can be included in the interactive communications appliance to make it more appealing to children. The figurine could further be constructed to be animatronic, to appear to speak to the listener.

Figure 4:
FIG. 4 shows a method of using an interactive communications appliance according to an embodiment of the invention.

A method according to an embodiment of the invention can be described with reference to FIGS. 1, 4 and 5. In embodiments of the invention, a user can use a client computer 18(a) to access a Web site 19 on a server computer 22. At the Web site 19, the user may create a user profile entering data into data fields in appropriate Web pages on the Web site 19. Alternatively, the user profile can be created using a program run on client computer 18(a) and the user profile can be uploaded to the server computer 22. Once created, the user's profile is stored in a personal profile database 24. The personal profile may also be usefully stored in the interactive communications appliance. The user's profile may include information such as the time that the user wants to receive information and the types of information that the user is interested in. In a typical example, the user may specify that the personalized information be delivered to the user's interactive communications appliance at 5:00 A.M. every morning. The user may also select topics of interest. For example, as shown in FIG. 4, the user can select science, sports, weather, or fun facts information on a Web page 110 of the Web site 19 by selecting a hyperlink corresponding to these topics.

Figure 5:
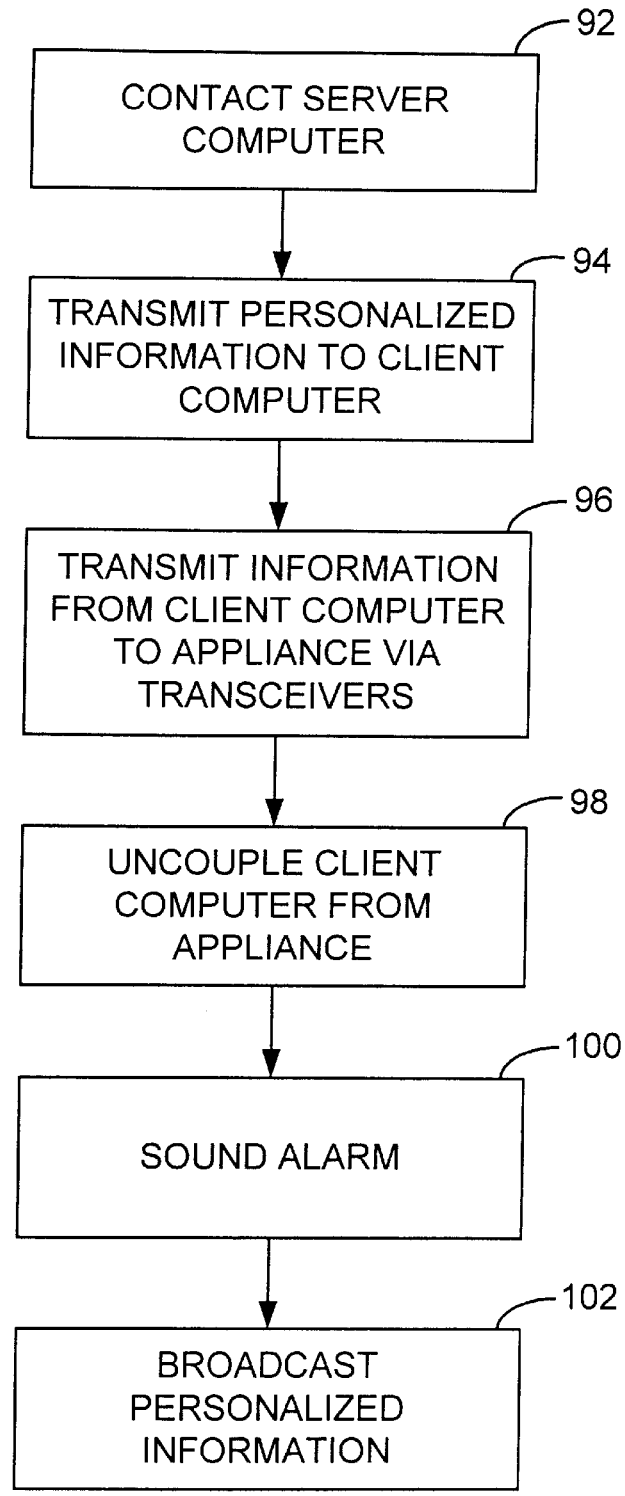
FIG. 5 shows an exemplary Web page according to an embodiment of the invention.

With reference to FIG. 5, at a predetermined time, client computer 18(a) can automatically establish contact with the server computer 22 (step 92). The server computer 22 can access the user's personal profile and may retrieve and arrange information according to the personal profile from a content database 26. In some embodiments, in addition to selecting information according to the user's profile, the server computer 22 can also filter through any gathered information and select only those informational items that are appropriate for the user's age or age range. The server computer 22 then transmits this personalized information back to the client computer 18(a) via the communication medium 32 (step 94). The client computer 18(a) may then transmit the received personalized information to the interactive communications appliance 16(a) (step 96). The personalized information is transmitted from the second transceiver 14(a) to a first transceiver 12(a) in the interactive communications appliance 16(a). A wireless link 11(a) is created between the first transceiver 12(a) and the second transceiver 14(a) to establish communication between the client computer 18(a) and the interactive communications appliance 16(a). The communications appliance 16(a) then stores the personalized information in memory. Once stored, the wireless link 11(a) between the first and second transceivers 12(a), 14(a) may be broken so that the first and second transceivers 12(a), 14(a) are no longer in communication with each other. At this time, the interactive communications appliance 16(a) may act as a stand-alone device once the content package is received in memory.

An alarm in the interactive communications appliance 16(a) sounds at a time set by the user to wake the user up (step 100). After the user turns the alarm off, the user is awake and the personalized information stored in memory is broadcast to the user (step 102). The broadcast information may include a broadcast sequence including audio segments concerning current, local weather information, yesterday's news headlines, yesterday's sports headlines, reminders for the day, and jokes. For example, an exemplary broadcast sequence with different audio segments may be as follows:

| | |
|---|---|
| Introduction | Concatenated Audio |
| Weather | Concatenated Audio |
| This Day In History | Recorded Audio |
| News | Recorded Audio |
| Sports | Concatenated Audio |
| Message | Text-to-Speech Audio |
| Fun Facts | Recorded Audio |
| Reminders | Text-to-Speech Audio |
| Horoscope | Recorded Audio |
| Jokes | Recorded Audio |
| Music | Recorded Audio |
| Conclusion | Recorded Audio |

Figure 6:
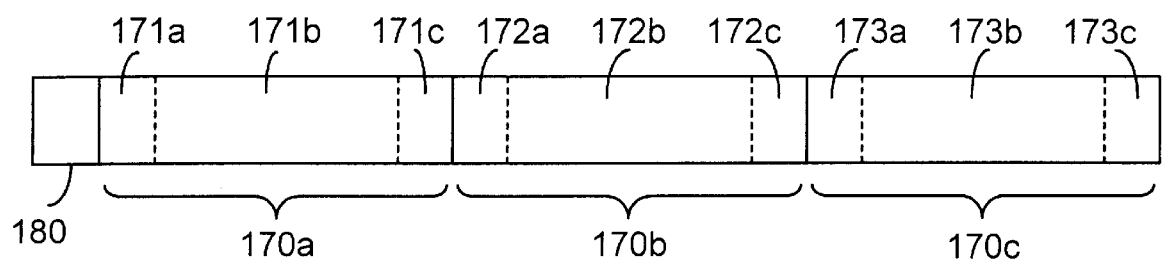
FIG. 6 shows a representation of a string of data for a concatenated audio sequence.

"Concatenated Audio" refers to an audio segment that includes some pre-recorded sound portions. These pre-recorded sequences can be played alone or can be combined with current information to create a new phrase. For example, the pre-recorded sound portions "Get up John!" can simply be a pre-recorded audio sound portions, while the pre-recorded sound portions "The temperature is (insert current temperature)" can be combined with the current temperature to provide a complete audio message about the current temperature. FIG. 6 shows a representation of a string of data bytes for a sequence of concatenated audio segments 170(a), 170(b), 170(c) preceded by an alarm byte 180 which causes the interactive communications appliance to sound an alarm. Each segment includes data representing a beginning audio portion 171(a), 172(a), 173(a), an intermediate audio portion 171(b), 172(b), 173(b) and an ending audio portion 171(c), 172(c), 173(c). The audio corresponding to each intermediate sound portion 171(b), 172(b), 173(b) and therefore each audio segment 170(a), 170(b), 170(c) may relate to respectively different topics. For example, the segments 170(a), 170(b), 170(c) may relate to weather, sports, reminders, and politics. The user may skip an individual segment, for example, by pushing an appropriate button on the user's interactive communications appliance if the user is not interested in the particular segment. In some embodiments, the interactive communications appliance, or the system in general, may learn from interactions such as these and the user's profile can be adjusted accordingly. For example, if the user repeatedly skips sports segments, then the user's profile can be updated to exclude or reduce the number of sports segments delivered to the user. The beginning audio portions 171 (a), 172(a), 173(a) and the ending audio portions 171(c), 172(c), 173(c) may include, for example, personalized greetings, topic introductory statements, or sound effects to indicate the beginning or end of a particular audio segment.

"Recorded Audio" refers to audio that is recorded without pre-recorded audio, reusable sound portions. This type of audio can be used for audio segments that do not typically have reusable text. For example, current news items such as an actual quote from a famous person may be played in full by the interactive communications appliance, without pre-recorded, reusable audio segments. "Text-to-Speech Audio" refers to text items which are converted from text data to speech data at the server computer, client computer or at the interactive communications appliance. The text data may be from a reminder that the user previously typed into an electronic scheduler on the client computer by the user. The server computer, the client computer or the interactive communications appliance can convert the text data into audio data so that the interactive communications appliance can broadcast the information to the user.

In embodiments of the invention, the broadcast sequence may include a mixture of informational items, reminders, music, and entertaining sounds specifically selected for the user. Consequently, the user can hear a unique audio sequence of information each day. As the broadcast content includes personalized information, it includes information that is relevant to the user and the user need not waste time listening to information which is not of interest to him. Moreover, as many fun sounds (e.g., special sound effects) are also provided in embodiment of the invention, listening to the broadcast personalized information can thus be both informative and entertaining.

Each audio segment in a broadcast sequence can be accessed by user interaction with the device. The user can skip an audio segment, repeat it, or go back to a previous segment. The users' interaction with the broadcast can be uploaded to the client computer and then to the server computer where it may be incorporated in the user's profile. The updated profile may be used to select future sequences or segments for the user.

While the foregoing is directed to certain preferred embodiments of the present invention, other and further embodiments of the invention may be devised without departing from the basic scope of the invention. Such alternative embodiments are intended to be included within the scope of the present invention. Moreover, the features of one or more embodiments of the invention may be combined with one or more features of other embodiments of the invention without departing from the scope of the invention.

What is claimed is:

1. A method for broadcasting personalized information, the method comprising:

(a) receiving a user profile for a user;

(b) obtaining personalized information based on the user profile;

(c) transmitting the personalized information to a client computer via a communication medium;

(d) transmitting the personalized information to an interactive communications appliance via a wireless link for storage; and (e) broadcasting the personalized information to the user, and wherein the method further comprises before broadcasting and after transmitting the personalized information to the interactive communications appliance, uncoupling the first and second transceivers.

2. A method for broadcasting personalized information, the method comprising:

(a) receiving a user profile for a user;

(b) obtaining personalized information based on the user profile;

(c) transmitting the personalized information to a client via a communication medium;

(d) transmitting the personalized information to an interactive communications appliance via a wireless link for storage; and (e) broadcasting the personalized information to the user, and wherein the method further comprises sounding an alarm in the interactive communications appliance prior to broadcasting.

3. The method of claim 1 wherein the personalized information includes at least one of sports information, educational information, weather information, TV programming information, and music.

4. The method of claim 1 further comprising transmitting schedule items to the interactive communications appliance; and broadcasting the schedule items to the user.

5. The method of claim 1 wherein the interactive communications appliance is an alarm clock.

6. The method of claim 1 wherein the personalized information comprises music selected in accordance with the user's personal profile.

7. The method of claim 1 further comprising:

creating the user profile using graphical user interfaces on a sever computer.

8. A method for broadcasting personalized information, the method comprising:

(a) receiving a user profile for a user;

(b) obtaining personalized information based on the user profile;

(c) transmitting the personalized information to a client computer via a communication medium;

(d) transmitting the personalized information to an interactive communications appliance via a wireless link for storage; and (e) broadcasting the personalized information to the user, and wherein the method further comprises preselecting one or more radio channels on the interactive communications appliance for broadcasting at predetermined times.

9. A method for broadcasting personalized information, the method comprising:

(a) receiving a user profile for a user;

(b) obtaining personalized information based on the user profile;

(c) transmitting the personalized information to a client computer via a communication medium;

(d) transmitting the personalized information to an interactive communications appliance via a wireless link for storage; and (e) broadcasting the personalized information to the user, and wherein obtaining personalized information based on the user profile comprises selecting information appropriate for the user's age.

10. The method of claim 9, further comprising:

sending a response of the user from the interactive communications appliance to the client computer or to a server computer in communication with the client computer.

11. The method of claim 9 wherein steps (c), (d), and (e) are performed according to a streaming audio process.

12. A method for broadcasting personalized information, the method comprising:

(a) receiving a user profile for a user;

(b) obtaining personalized information based on the user profile; and (c) transmitting the personalized information to a client computer via a communication medium;

wherein the personalized information is to be transmitted to an interactive communications appliance via a wireless link for storage, and is to be broadcasted to the user, and wherein an alarm in the interactive communications appliance sounds prior to broadcasting.

13. The method of claim 12 wherein the communication medium comprises the Internet.

14. A method for broadcasting personalized information, the method comprising:

(a) receiving a user profile for a user;

(b) obtaining personalized information based on the user profile; and (c) transmitting the personalized information to a client computer via a communication medium;

wherein the personalized information is to be transmitted to an interactive communications appliance via a wireless link for storage, is to be broadcasted to the user, and wherein obtaining personalized information based on the user profile comprises selecting information appropriate for the user's age.

15. The method of claim 14 wherein the communication medium comprises the Internet.

* * * * *